Aug. 28, 1962  F. M. RYCK  3,051,516

WINDSHIELD WIPER ARM ATTACHMENT

Filed Oct. 14, 1959

INVENTOR.
FRANCIS M. RYCK
BY
*W. E. Finke*
HIS ATTORNEY

United States Patent Office 3,051,516
Patented Aug. 28, 1962

3,051,516
WINDSHIELD WIPER ARM ATTACHMENT
Francis M. Ryck, Rochester, N.Y., assignor to General Motors Corporation, Detroit, Mich., a corporation of Delaware
Filed Oct. 14, 1959, Ser. No. 846,412
8 Claims. (Cl. 287—53)

This invention pertains to windshield wipers, and particularly to improved means for attaching a wiper arm to a wiper shaft permitting infinite angular adjustment therebetween.

Heretofore, numerous means for attaching wiper arms to wiper shafts have been devised. However, the majority of prior art devices of this type do not permit infinite angular adjustment of the arm relative to its actuating shaft, which arrangement is highly desirable since it facilitates accurate positioning of the blades against the lower reveal molding of the windshield when the wiper blades are parked. The present invention relates to simplified means for attaching a wiper arm to its pivot shaft which, when released, permit infinite angular adjustment therebetween. Accordingly, among my objects are the provision of infinitely angularly adjustable attachment means for interconnecting a wiper arm and a pivot shaft; the further provision of means for attaching a wiper arm to a pivot shaft including a compressible wedge; and the still further provision of windshield wiper arm attachment means comprising an annulus of compressible material adapted to be wedgingly interlocked with a pivot shaft.

The aforementioned and other objects are accomplished in the present invention by incorporating an annulus of compressible material arranged transversely relative to the axis of the pivot shaft in combination with means for deforming the annulus so as to drivingly interconnect a wiper arm and its pivot shaft. Specifically, the improved attaching means is designed for use with a windshield wiper arm having spring hinge connecting inner and outer sections, the inner section comprising a die casting having a socket recess therein.

In the disclosed embodiment, the actuating, or pivot shaft, is formed with an annular groove adjacent its outer end, the groove being axially serrated. The inner arm section is formed with a transverse opening, a portion of which intersects the socket recess. An annulus of flexible clamping material, such as rubber or a suitable plastic, is inserted in the transverse opening of the inner arm section in alignment with the annular groove in the pivot shaft. The transverse opening includes a threaded portion which receives a cap screw, the shank portion of which extends through the clamping annulus such that when the screw is tightened the annulus is compressed, or deformed, into wedging engagement with the locking serrations in the groove of the pivot shaft thereby securely locking the inner arm section for movement in unison with the pivot shaft. When the locking screw is removed, the inner arm section can be infinitely angularly adjusted relative to the pivot shaft.

Further objects and advantages of the present invention will be apparent from the following description, reference being had to the accompanying drawings, wherein a preferred embodiment of the present invention is clearly shown.

Figure 1:
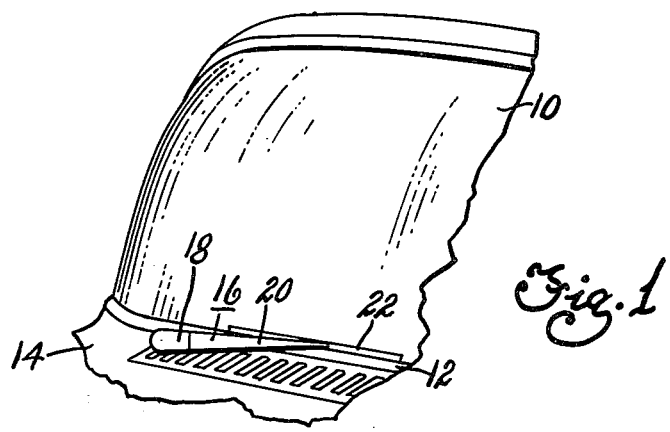
FIGURE 1 is a fragmentary view of a portion of a vehicle having a wiper arm with the improved attachment means of the present invention.

With particular reference to FIGURE 1, a portion of a vehicle is shown including a windshield 10 having a lower reveal molding 12. A pivot shaft, not shown in FIGURE 1, extends through the cowl 14 on each side of the vehicle, a wiper arm 16 being attached to each shaft. The wiper arm 16 may include spring hinge connected inner and outer sections 18 and 20, the outer section of which detachably carries a wiper blade 22 adapted for oscillatory movement across the surface of the windshield. When the wiper actuating means are inactivated the wiper blade 22 is preferably moved to the depressed parked position against the lower reveal molding 12. In order to accurately determine this parked position, the inner arm section 18 is connected to its pivot shaft in a manner so that it is infinitely angularly adjustable relative thereto.

Figure 2:
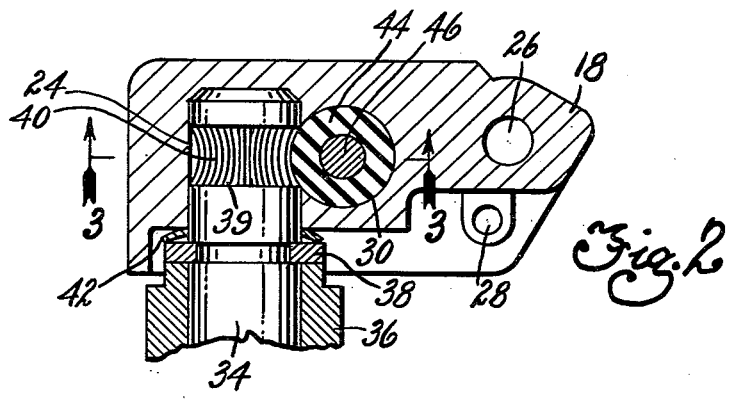
FIGURE 2 is an enlarged fragmentary view, partly in section and partly in elevation, of the inner arm section.
Figure 3:
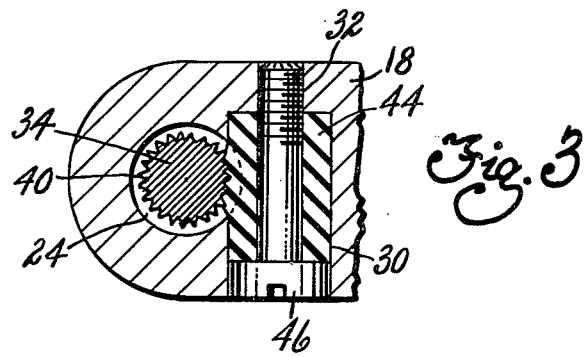
FIGURE 3 is a fragmentary sectional view taken along lines 3—3 of FIGURE 2.

With reference to FIGURES 2 and 3, the details of the improved attachment means will be described. The inner arm section 18 preferably comprises a die casting having a socket recess 24, a transverse opening 26 adapted to receive a hinge pin, not shown, for interconnecting the inner and outer sections, and an opening 28 for supportig a spring retainer, not shown. In addition, the inner arm section 18 is formed with a transverse opening 30 of stepped diameter, the larger diameter portion of which intersects the socket recess 24. The smaller diameter portion of the opening 30 is threaded, as indicated by numeral 32.

The inner section 18 is adapted to be drivingly connected with a pivot shaft 34 journalled by suitable bearings, not shown, in a pivot shaft housing 36. In order to prevent axial movement of the pivot shaft 34 relative to the housing 36, the pivot shaft is formed with an annular groove which receives a retaining ring 38, the retaining ring 38 also engaging the outer end of the housing 36. The pivot shaft 34 is also formed with an annular groove 39 of partially cylindrical cross section adjacent its outer end, the annular groove 39 having axial serrations 40. When the inner arm section 18 is assembled over the pivot shaft 34, the groove 39 is aligned with the larger diameter portion of the transverse opening 30. A spring washer 42 is interposed between the inner arm section 18 and the retaining ring 38.

In order to lock the inner arm section 18 to the pivot shaft 34, an annulus 44 of flexible clamping material is inserted in the larger diameter portion of the opening 30, so that a portion of the annulus 44 is situated in the annular groove 39 of the pivot shaft. Thereafter, a cap screw 46 is inserted through the annulus 44 with the end engaging the threaded portion 32. When the cap screw 46 is tightened, the annulus 44 is compressed. By compressing the annulus 44 the annulus becomes wedgingly locked with the serrations 40 in the annular groove 39 so as to securely drivingly connect the inner arm section 18 with the pivot shaft 34. When the cap screw 46 is loosened, the lock is released thereby permitting infinite angular adjustment of the inner arm section relative to the pivot shaft to accurately position the wiper blade 22.

While the embodiment of the invention as herein disclosed constitutes a preferred form, it is to be understood that other forms might be adopted.

What is claimed is as follows:

1. In a windshield wiper organization, an actuating shaft having a serrated annular groove adjacent its outer end, an inner arm section having a socket recess adapted to receive the end of said actuating shaft, elastically compressible wedge means of rubber-like material arranged transversely of the axis of said shaft and carried by said inner arm section for engaging said serrated groove, and means for compressing said wedge means to securely lock the inner arm section to said shaft at an infinite number of relative angular positions therebetween.

2. In a windshield wiper organization, an actuating shaft having a serrated annular groove adjacent its outer end, an inner arm section having a socket recess adapted to receive the end of said actuating shaft, said inner arm section having a transverse opening intersecting said socket recess, elastically compressible wedge means of rubber-like material disposed within said transverse opening in alignment with the serrated groove in said shaft, and means for compressing said wedge means to securely lock the inner arm section to said shaft at an infinite number of relative angular positions therebetween.

3. In a windshield wiper organization, an actuating shaft having a serrated annular groove adjacent its outer end, an inner arm section having a socket recess adapted to receive the end of said actuating shaft, said inner arm section having a transverse opening therethrough of stepped diameter, the larger diameter portion of which intersects said socket recess and the smaller diameter portion of which is threaded, elastically deformable wedge means of rubber-like material disposed within said larger diameter portion of said transverse opening and adapted to engage the serrated groove of said shaft, and a threaded device engageable with said wedge means for deforming the same to securely lock the inner arm section to said shaft at an infinite number of relative angular positions therebetween.

4. In a windshield wiper organization, an actuating shaft having a serrated groove adjacent its outer end, an inner arm section having a socket recess adapted to receive the end of said actuating shaft, said inner arm section having a transverse opening of stepped diameter, the larger diameter portion of which intersects said socket recess and the smaller diameter portion of which is threaded, an annulus of elastically compressible rubber-like material disposed within said larger diameter portion in alignment with the annular groove of said shaft, and a screw threadedly engaging the smaller diameter portion of said transverse opening and extending through said annulus for compressing said annulus to securely lock the inner arm section to said shaft at an infinite number of relative angular positions therebetween.

5. The windshield wiper organization set forth in claim 4 wherein the groove adjacent the outer end of said actuating shaft is partially cylindrical in cross-section and wherein said serrations are axially arranged.

6. In a windshield wiper organization, an actuating shaft having a serrated groove adjacent its outer end, a housing rotatably supporting said shaft, said shaft having a second annular groove spaced inwardly from said first annular groove, a retaining ring situated in said second annular groove for limiting relative axial movement between said shaft and said housing, an inner arm section having a socket recess adapted to receive the end of said actuating shaft, elastically compressible wedge means of rubber-like material carried by the inner end section and adapted to engage the serrated groove of said shaft, and means for compressing said wedge means to securely lock the inner arm section to said shaft at an infinite number of relative angular positions therebetween.

7. The windshield wiper organization set forth in claim 6 including a spring washer disposed between the inner arm section and said retaining ring.

8. The windshield wiper organization set forth in claim 6 wherein said inner arm section includes a transverse opening of stepped diameter, the larger diameter portion of which intersects said socket recess and the smaller diameter portion of which is threaded, wherein said wedge means comprises an annulus of rubber-like material, and wherein said last recited means comprises a screw device extending through said annulus of rubber-like material and engaging the threaded portion of said transverse opening for compressing said annulus.

References Cited in the file of this patent

UNITED STATES PATENTS

| 1,421,408 | Collyer | July 4, 1922 |
| 1,791,798 | Coen | Feb. 10, 1931 |
| 2,586,096 | Schaal | Feb. 19, 1952 |
| 2,869,237 | Berge | Jan. 20, 1959 |
| 2,888,282 | Naimer | May 26, 1959 |
| 2,941,812 | Reynolds | June 21, 1960 |

FOREIGN PATENTS

| 381,915 | Great Britain | Oct. 13, 1932 |
| 497,366 | Great Britain | Dec. 19, 1938 |
| 680,690 | Great Britain | Oct. 8, 1952 |
| 1,007,391 | France | Feb. 6, 1952 |